United States Patent
Hendron et al.

(10) Patent No.: US 11,635,262 B2
(45) Date of Patent: Apr. 25, 2023

(54) ROTARY HEAT EXCHANGER AND SYSTEM THEREOF

(71) Applicant: DEERE & COMPANY, Moline, IL (US)

(72) Inventors: Scott S. Hendron, Dubuque, IA (US); Sean P. West, Dubuque, IA (US); Reginald M. Bindl, Bettendorf, IA (US); Mark J. Cherney, Potosi, WI (US)

(73) Assignee: DEERE & COMPANY, Moline, IL (US)

( * ) Notice: Subject to any disclaimer, the term of this patent is extended or adjusted under 35 U.S.C. 154(b) by 58 days.

(21) Appl. No.: 16/227,227

(22) Filed: Dec. 20, 2018

(65) Prior Publication Data

US 2020/0200186 A1 Jun. 25, 2020

(51) Int. Cl.
*F01P 5/00* (2006.01)
*F28D 11/02* (2006.01)
*F04D 29/38* (2006.01)
*F01P 5/04* (2006.01)
*F04D 29/32* (2006.01)
(Continued)

(52) U.S. Cl.
CPC ............. *F28D 11/025* (2013.01); *F01P 5/04* (2013.01); *F04D 19/002* (2013.01); *F04D 29/329* (2013.01); *F04D 29/386* (2013.01); *F01P 11/10* (2013.01); *F01P 2005/046* (2013.01); *F01P 2070/30* (2013.01)

(58) Field of Classification Search
CPC . F28D 11/02; F28D 11/025; F01P 5/02; F01P 5/04; F01P 2070/30; F28F 5/04; F25B 3/00
See application file for complete search history.

(56) References Cited

U.S. PATENT DOCUMENTS 702,994 A * 6/1902 Porter ........................ F28F 5/06
165/87
1,458,321 A * 6/1923 Bowman ................ F28D 11/025
123/41.43
(Continued)

FOREIGN PATENT DOCUMENTS

CN 106949766 A * 7/2017
DE 379917 C * 8/1923 ............ F28D 11/025
(Continued)

OTHER PUBLICATIONS

German Search Report issued in counterpart application No. 102019220259.4 dated Aug. 28, 2020 (08 pages).

*Primary Examiner* — Eric S Ruppert
(74) *Attorney, Agent, or Firm* — Taft Stettinius & Hollister LLP; Stephen F. Rost

(57) ABSTRACT

A rotary heat exchanger includes a hub configured to be rotatably driven by a shaft, a fan including a plurality of fan blades integrally coupled to the hub and extending radially outwardly therefrom, and a heat exchanger including a plurality of heat exchanger sections. The heat exchanger includes a plurality of cooling fins for receiving air from the fan. Each of the plurality of heat exchanger sections is located between two of the plurality of fan blades. The hub, the fan, and the heat exchanger are integrally formed as a single body by a three-dimensional printing process.

20 Claims, 10 Drawing Sheets

(51) Int. Cl.
*F04D 19/00* (2006.01)
*F01P 11/10* (2006.01)

(56) References Cited

U.S. PATENT DOCUMENTS

| | | | | |
|---|---|---|---|---|
| 1,858,226 A | * | 5/1932 | Hlavaty | F28D 11/025 |
| | | | | 165/87 |
| 1,903,471 A | * | 4/1933 | Murphy | F28D 11/025 |
| | | | | 165/87 |
| 2,110,621 A | * | 3/1938 | Cohen | F04D 29/38 |
| | | | | 392/362 |
| 3,612,168 A | * | 10/1971 | Peterson | F28D 11/04 |
| | | | | 165/86 |
| 3,835,921 A | * | 9/1974 | Faris | F28D 11/02 |
| | | | | 165/86 |
| 6,120,247 A | * | 9/2000 | Wheeler | F04D 25/088 |
| | | | | 416/1 |
| 9,683,569 B2 | * | 6/2017 | Collins | F04C 29/0007 |
| 2005/0006059 A1 | | 1/2005 | Tarasinski | |
| 2008/0264094 A1 | * | 10/2008 | Campagna | F02G 5/02 |
| | | | | 62/402 |
| 2013/0108442 A1 | * | 5/2013 | Rosati | F04D 29/382 |
| | | | | 416/1 |
| 2017/0248347 A1 | | 8/2017 | Miller | |
| 2019/0170158 A1 | * | 6/2019 | Azzouz | F04D 29/326 |

FOREIGN PATENT DOCUMENTS

| | | | | | |
|---|---|---|---|---|---|
| DE | 2404488 A1 | | 8/1974 | | |
| DE | 2511057 A1 | | 10/1975 | | |
| DE | 2430435 B2 | | 8/1976 | | |
| FR | 362243 A | * | 6/1906 | | F28D 11/025 |
| FR | 1131043 | | 2/1957 | | |
| GB | 1497813 | | 1/1978 | | |
| GB | 2422003 A | * | 7/2006 | | F04D 29/582 |
| JP | 01230994 A | * | 9/1989 | | |

* cited by examiner

ROTARY HEAT EXCHANGER AND SYSTEM THEREOF

FIELD OF THE DISCLOSURE

The present disclosure relates to a cooling system of a machine, and in particular, to an integrated heat exchanger and rotary airfoil and a system including the same.

BACKGROUND OF THE DISCLOSURE

In a motorized vehicle or work machine, conventional cooling packages have not changed significantly over the years. In general, these conventional packages are rectangular boxes and utilize manual processes for manufacturing. Moreover, fans have not evolved much either. There are several types of conventional fans including centrifugal, axial, propeller, tube-axial, vane-axial, etc.

Accordingly, original equipment manufacturers, or OEMs, often build machines requiring these systems for their cooling needs only have these conventional systems available for use. Over the years, particularly as machine size and design has changed, the conventional cooling packages have resulted in limitations and often obstacles to the overall machine. In particular, these conventional systems often lead to constraints on operator visibility, machine size, and component packaging space.

Thus, there is a need for an improved cooling package design for a motorized vehicle or work machine that does not limit the design constraints previously described.

SUMMARY

In one embodiment of the present disclosure, a rotary heat exchanger includes a hub configured to be rotatably driven by a shaft; a fan comprising a plurality of fan blades integrally coupled to the hub and extending radially outwardly therefrom; and a heat exchanger comprising a plurality of heat exchanger sections, the heat exchanger including a plurality of cooling fins for receiving a flow of air from the fan; wherein each of the plurality of heat exchanger sections is located between two of the plurality of fan blades; further wherein, the hub, the fan, and the heat exchanger are integrally formed as a single body by a three-dimensional printing process.

In one example of this embodiment, the hub, the fan, and the heat exchanger are rotatably driven about a rotation axis. In a second example, a rotary manifold may be coupled to the hub, the rotary manifold including a fluid passage defined therein for conveying a fluid to the heat exchanger. In a third example, at least a portion of the rotary manifold is integrally formed as part of the single body via the three-dimensional printing process. In a fourth example, the rotary manifold includes an inlet and an outlet, the inlet being configured to receive fluid and convey the fluid to the heat exchanger and the outlet being configured to receive the fluid from the heat exchanger. In a fifth example, a fluid passage is defined in the heat exchanger, the fluid passage being fluidly coupled to the inlet and outlet of the rotary heat exchanger.

In a sixth example, a first fluid passage is defined in a first heat exchanger section of the plurality of heat exchanger sections; and a second fluid passage is defined in a second heat exchanger section of the plurality of heat exchanger sections; wherein, the first fluid passage is fluidly coupled to the second fluid passage such that a fluid flowing through the heat exchanger flows through the first and second fluid passages. In a seventh example, a first fluid passage is defined in a first heat exchanger section of the plurality of heat exchanger sections; and a second fluid passage is defined in the first heat exchanger section; wherein, the first fluid passage is fluidly isolated from the second fluid passage such that a first fluid flows through the first fluid passage and a second fluid flows through the second fluid passage.

In an eighth example, a fluid passage is defined in at least one heat exchanger section, the fluid passage comprising a diameter which is larger at a radial location near the hub and smaller at a radial location away from the hub. In a ninth example, the heat exchanger may be formed having a circular profile. In a tenth example, the plurality of cooling fins are curvilinearly shaped. In another example, the plurality of cooling fins have a shape and orientation relative to a direction of air flow receiving from the fan. In a further example, the fan includes at least one of a centrifugal fan, an axial fan, a propeller fan, a tube-axial fan, a vane-axial fan or a squirrel cage fan. In yet a further example, the fan comprises a front side, a rear side, a leading edge and a trailing edge; and each of the plurality of heat exchanger sections comprises a wedge-shape and is integrally formed between the rear side of one fan blade of the plurality of fan blades and a trailing edge of a laterally adjacent fan blade of the plurality of fan blades.

In another embodiment of the present disclosure, a rotary heat exchanger includes a hub; a fan comprising a plurality of fan blades integrally coupled to the hub and extending radially outwardly therefrom; and a heat exchanger comprising a plurality of heat exchanger sections each of which is located between two of the plurality of fan blades, the heat exchanger including a plurality of cooling fins for receiving a flow of air from the fan; wherein, the heat exchanger is substantially planar; wherein, the hub, the fan, and the heat exchanger are integrally formed as a single body by a three-dimensional printing process.

In one example of this embodiment, each of the plurality of heat exchanger sections is integrally formed between a trailing edge of one fan blade of the plurality of fan blades and a trailing edge of an adjacent fan blade of the plurality of fan blades. In a second example, each of the plurality of heat exchanger sections comprises a gap radially defined adjacent to a trailing edge of one fan blade of the plurality of fan blades, the gap being larger than a spacing between the plurality of cooling fins of the respective heat exchanger section. In another example, the plurality of cooling fins are variably spaced relative to one another.

In a further embodiment of the present disclosure, a cooling system of a vehicle, includes an engine for generating power; a pump for pumping a fluid; and a rotary heat exchanger for cooling the fluid, the rotary heat exchanger manufacturing by a three-dimensional process and comprising a hub; a fan comprising a plurality of fan blades integrally coupled to the hub and extending radially outwardly therefrom; a heat exchanger comprising a plurality of heat exchanger sections, the heat exchanger including a plurality of cooling fins for receiving a flow of air from the fan; and a rotary manifold coupled to the hub, the rotary manifold comprising a fluid passage defined therein for conveying the fluid from the pump to the heat exchanger; wherein each of the plurality of heat exchanger sections is located between two of the plurality of fan blades; wherein, the rotary heat exchanger is rotatably driven to direct the air through the plurality of cooling fins to reduce a temperature of the fluid passing through the heat exchanger. A mechanical or electrical motor may convey rotary motion to the rotary heat exchanger.

In one example of this embodiment, one or more rotary heat exchangers may be axially aligned with the first rotary heat exchanger, the second rotary heat exchanger positioned to receive at least a portion of the flow of air exiting the first rotary heat exchanger.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
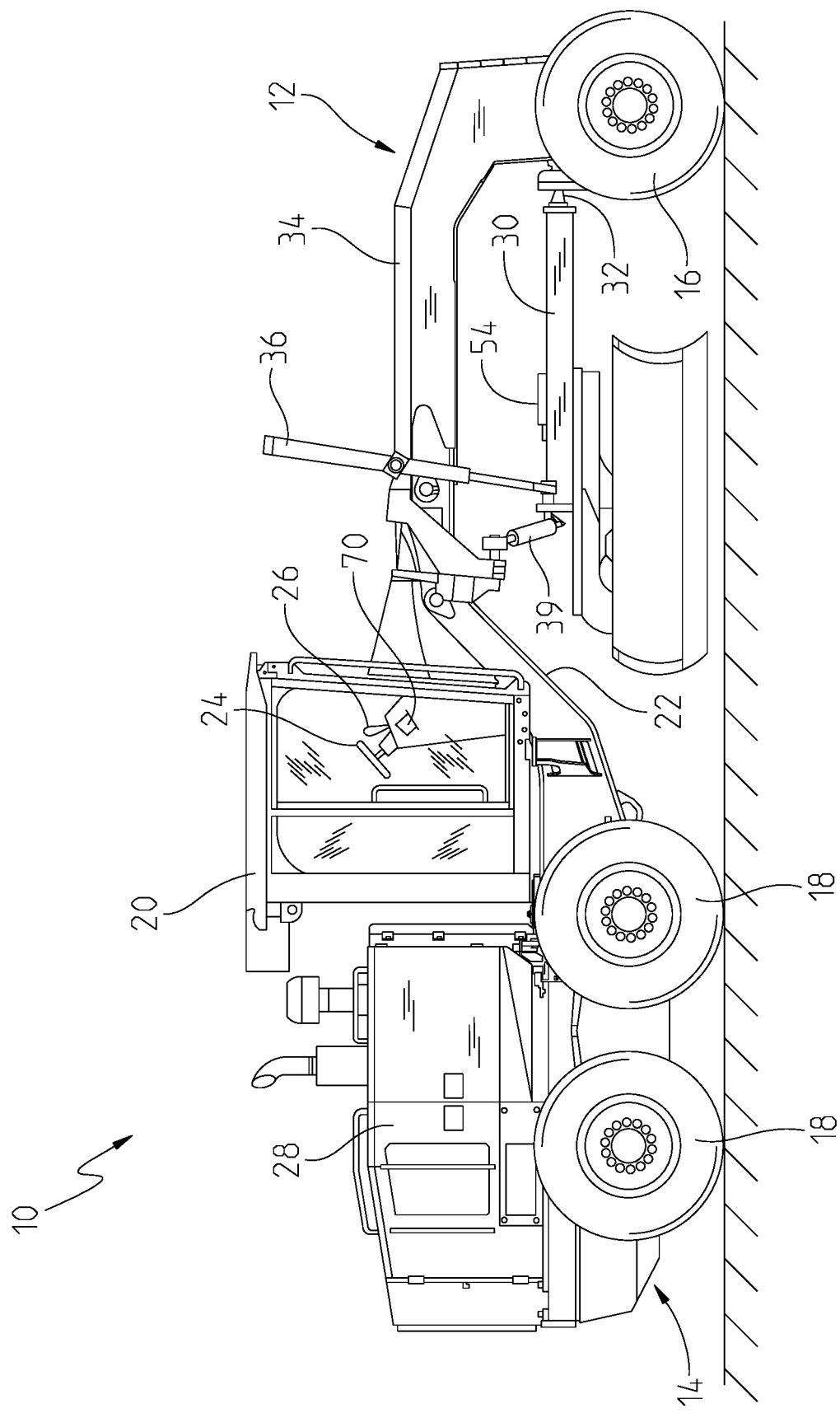
FIG. 1 is a side view of a motor grader.

Referring to FIG. 1, a motor grader 10 is shown including front and rear frames 12 and 14, respectively, with the front frame being supported on a pair of front wheels 16, and with the rear frame being supported on right and left tandem sets of rear wheels 18. An operator cab 20 is mounted on an upwardly and forwardly inclined rear region 22 of the front frame 12 and contains various controls for the motor grader disposed so as to be within the reach of a seated or standing operator. These controls including a steering wheel 24, a lever assembly 26, and a user interface 70 to name a few.

An engine 28 is mounted on the rear frame 14 and supplies the driving power for all driven components of the motor grader. For example, the engine 28 is coupled for driving a transmission coupled to the rear wheels 18 at various selected speeds and either in forward or reverse modes. A hydrostatic front wheel assist transmission may be selectively engaged to power the front wheels 16, in a manner well known in the art. Further, the engine 28 may be coupled to a pump or a generator to provide hydraulic, pneumatic, or electrical power to the motor grader 10 as is known in the art.

Mounted to a front location of the front frame 12 is a drawbar 30, having a forward end universally connected to the front frame by a ball and socket arrangement 32 and having opposite right and left rear regions suspended from an elevated central section 34 of the main frame 12 by right and left lift linkage arrangements including right and left extensible and retractable hydraulic actuators (only right actuator 36 is shown). A side shift linkage arrangement is coupled between the elevated frame section 34 and a rear location of the drawbar 30 and includes an extensible and retractable side swing hydraulic actuator 38.

The right, left, and side swing hydraulic actuators 36, 38 may be repositionable to alter a cross slope of a moldboard or blade 46 via a four-bar linkage referred to as a saddle assembly 50. The saddle assembly 50 will be described in more detail below. The cross slope may be the angle of the blade 46 relative to the underlying surface. More specifically, the wheels 16, 18 of the motor grader 10 may rest on the underlying surface to establish a surface plane. The actuators 36, 38 may be selectively resized to pivot the blade 46 about the ball and socket arrangement 32 to thereby change the angular orientation of the blade 46 relative to the underlying surface or surface plane. For example, the actuators 36, 38 may have a neutral position wherein the left and right actuators 36 are sized to ensure the blade 46 is substantially parallel with the underlying surface. Alternatively, the actuators 36, 38 may have a cross slope orientation where the actuators 36, 38 are sized to angularly offset the blade 46 relative to the underlying surface. The cross slope of the blade 46 may be biased towards either side of the motor grader as is known in the art.

The blade 46 may also be mounted on a side shift assembly (not shown) to slidably move between a first side and a second side. More specifically, a hydraulic side shift actuator interconnects a tilt frame and the side shift assembly and is operable to side shift the blade 46 relative to a longitudinal axis (or centerline) of the work machine 10. Further, the side shift actuator may selectively slide the blade 46 along the side shift assembly to be biased towards different sides of the longitudinal axis as desired by the user.

Also in FIG. 1 is a circle drive motor 54 that may include an outer shaft for operably driving a circle drive (not shown). A circle (not shown in FIG. 1) is mounted to a rear region of the drawbar 30 for rotation about an upright axis as known in the art. The blade 46, or moldboard, extends parallel to and beneath the circle and is fixedly coupled thereto. As the circle is operably driven via the circle drive, the blade 46 is also angularly adjusted. This particular design is conventional and known in the art.

Although a motor grader is illustrated in FIG. 1, it is to be understood that the present disclosure and its teachings are not limited to such a work machine. The principles and teachings of the present disclosure may apply to any vehicle, aircraft or work machine. Moreover, as will be described, the present disclosure may apply to different cooling systems and the like. Thus, the description above with respect to the motor grader is but one example of the type of machine into which the present disclosure may be incorporated.

Figure 2:
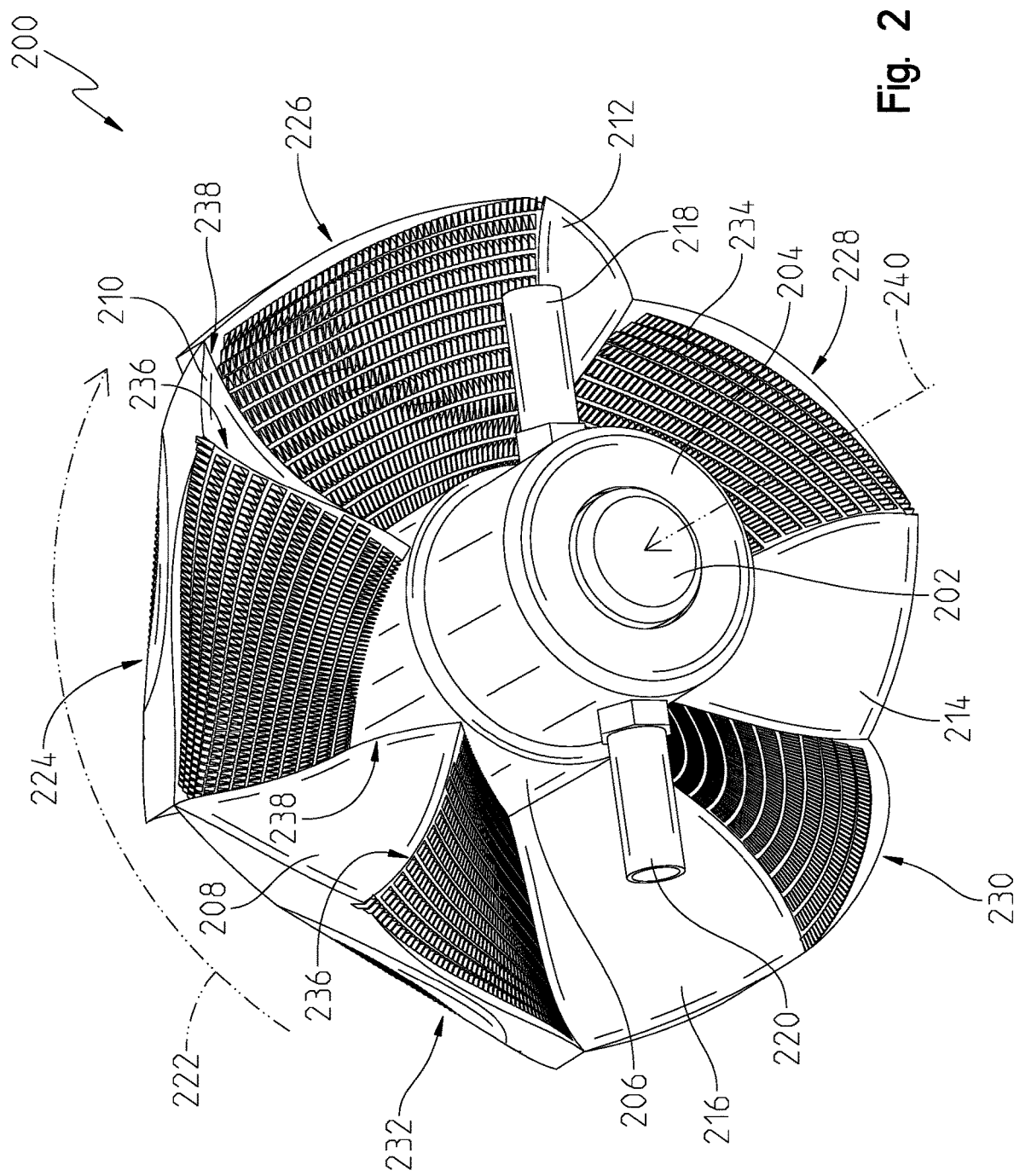
FIG. 2 is a front perspective view of a first embodiment of a rotary heat exchanger.

Referring to FIG. 2, an embodiment of a rotary heat exchanger 200 is illustrated. The rotary heat exchanger 200 may be integrally manufactured by a three-dimensional printing or additive manufacturing process to achieve optimal flow through a desirable heat exchanger profile and fluid passages. In this embodiment, the heat exchanger may have a form factor of a rotary airfoil. The rotary heat exchanger ("RHE") 200 may rotate about an axis while the airfoil draws air through the heat exchanger. Thus, the RHE is a combination of an air foil and heat exchanger combined into a single unit and fabricated using additive manufacturing.

In FIG. 2, the RHE 200 may include a shaft 202 which may be coupled to a motor, engine, or other power source. The shaft 202 may define a longitudinal axis about which the RHE 200 rotates in a rotational direction 222. In FIG. 2, the rotational direction 222 corresponds with a clockwise direction. In other embodiments, however, the rotational direction 222 may be counterclockwise.

The RHE 200 may include a rotary hydraulic manifold 204 that is integrally fabricated with the airfoil and heat exchanger. The manifold 204 may include a plurality of openings and passages through which one or more fluids may enter and exit. For example, the manifold 204 may include an inlet to which a first fluid line 218 is coupled. The first fluid line 218 may supply a fluid that is at a hot temperature such that it enters the RHE and is cooled to a lesser temperature upon exiting. The manifold 204 may also include an outlet to which a second fluid line 220 is coupled. The second fluid line 220 may allow fluid exiting the RHE 200 to flow to another portion of a larger system.

The RHE 200 may also include a hub 206 to which the air foil and heat exchanger portions are coupled. The hub 206 may be integrally fabricated as part of the RHE 200. The air foil may include a plurality of fan blades integrally coupled to the hub 206. In the illustrated embodiment, the plurality of fan blades may include a first fan blade 208, a second fan blade 210, a third fan blade 212, a fourth fan blade 214, and a fifth fan blade 216. While only five fan blades are shown in FIG. 2, it is to be understood that the present disclosure is not limited to a certain number of fan blades. The number of fan blades may depend on the size of the RHE 200, the desired cooling, etc.

The air foil of the RHE 200 is located forward of the heat exchanger. In FIG. 2, the heat exchanger may include a plurality of heat exchanger portions or sections as shown. Here, the heat exchanger may include a first heat exchanger portion 224, a second heat exchanger portion 226, a third heat exchanger portion 228, a fourth heat exchanger portion 230, and a fifth heat exchanger portion 232. Each heat exchanger portion is disposed between a pair of fan blades. Thus, in this embodiment, there may be an equal number of heat exchanger sections as there are fan blades.

During operation, the RHE 200 may be rotatably driven by a power source as described above. As it does so, the plurality of fan blades of the air foil draw or induces air to flow through the plurality of heat exchanger sections. Each heat exchanger section is formed by a plurality of fins 234 and fluid channels or passages (as described below). The plurality of heat exchanger sections therefore function similar to a radiator.

A fluid may flow into the inlet of the rotary manifold 204, which conveys the fluid through the RHE 200. One or more of the heat exchanger sections or portions may receive the fluid from the rotary manifold, where the fluid flows through a channel or passage therein before returning to the rotary manifold and exiting through the outlet. The rotary manifold 204 may be designed for the transmission of fluid, water, coolants, air or any other fluid or gas, and the manifold 204 may include a plurality of ports. Each port may allow fluid to enter and exit a respective heat exchanger section, and thus fluidly couple the rotary manifold 204 to the section.

The entire RHE 200 may continuously rotate as it is driven by the shaft 202. Fluid may enter the rotary manifold at a high pressure to allow the fluid to flow through the RHE as needed for desired cooling.

As will be described further below, the design of the RHE 200 via additive manufacturing allows it to be customized to a certain space. In conventional cooling systems, particularly for a motor grader such as the one depicted in FIG. 1, the cooling system is disposed in a rectangular space. The conventional cooling system is formed by several, if not many, individual parts. Moreover, a complex machine such as the motor grader may include several cooling systems, and each system may be stacked together within the same compartment. This can occupy a significant amount of space.

With the RHE 200, however, the design can be packaged for given space constraints to improve overall compactness and visibility from an operator cab. The heat exchanger shape, for example, may follow a curvature of the air flow passing therethrough. Further, the shape and curvature of the fins 234 of each heat exchanger section may be oriented to promote better air flow through the respective section and thereby achieve optimal efficiency. This level of efficiency can be achieved when the fin design and shape is suited to the natural flow of air that occurs in a given system, and with additive manufacturing, the RHE 200 of FIG. 2 is one embodiment capable of achieving optimal efficiency.

Figure 5:
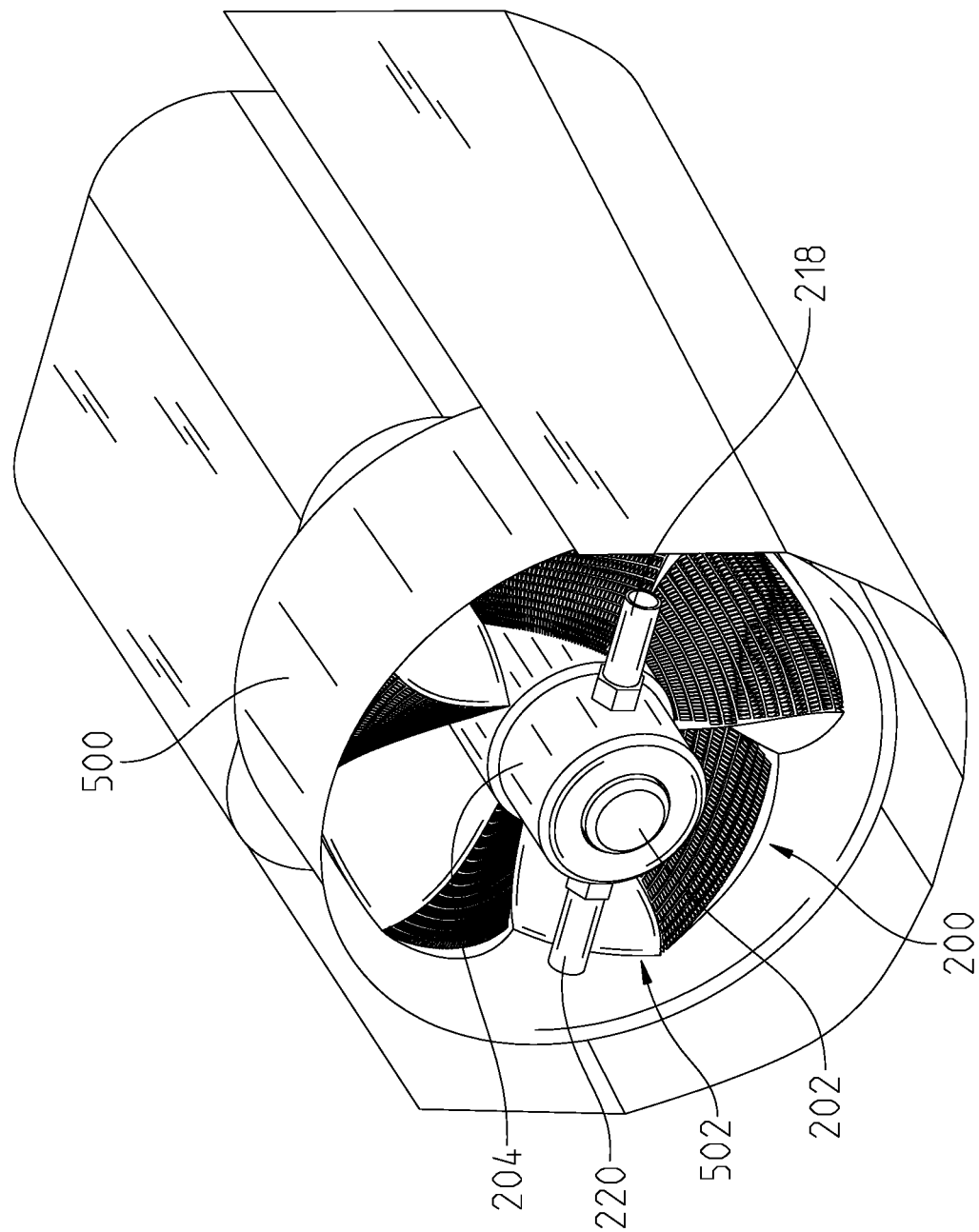
FIG. 5 is a perspective view of a circular hood enclosing the rotary heat exchanger of FIG. 2.

An example of this is best shown in FIG. 5. Here, the RHE 200 is positioned within a substantially round or curved hood 500 or frame. The RHE 200 is shown having a round profile 502 that operably fits within the hood 500. This is illustratively in contrast to the engine compartment of FIG. 1. As shown in FIG. 1, a conventional engine 28 is disposed in a large, rectangular compartment. The machine 10 may include one or more conventional cooling systems disposed in the compartment as well. The rectangular-shaped compartment is large in size and can block or obstruct the view of an operator from the cab 20. On the other hand, with the round hood 500 and round profile 502 of the RHE 200 in FIG. 5, the operator is better able to see the outside of the machine and surrounding area of the machine. Moreover, the round or circular profile of the RHE 200 may provide the most area for the least perimeter length. Here, a uniform stream of air may flow across each heat exchanger segment or portion.

The curved profile 502 of the RHE 200 may also provide other benefits. For example, the profile may allow for additional room for plumbing. In addition, multiple rotary heat exchangers may be aligned or stacked in a direction parallel to the air flow. In this case, it may be desirable to vary the overall size of the multiple rotary heat exchangers. In doing so, it may be desirable to index subsequent heat exchanger sections to optimize the airflow therethrough. In one instance, indexing may be dynamically changed based on speed. In another instance, indexing may be passively changed by using a torsional spring (not shown). In any event, there will likely be a pressure drop across each RHE which will impact heating on the RHE located further downstream. While each RHE may receive the same amount of air, the core of the first or most upstream RHE will be the coolest as it has a different heating effect than the other cores.

In a conventional heat exchanger, aluminium or copper fins are often used. During the manufacturing process, the fins are usually positioned parallel to one another in a horizontal and vertical orientation. This often is due to the limitations in the manufacturing process of stamping out the fins. For instance, in a conventional stamping process, a flat sheet of aluminium or copper is placed between a pair of stamping dies and the sheet is compressed to form the shape of the fins. This, however, is not the most efficient and effective manner for directing airflow. With 3-D printing and additive manufacturing, however, the design and shape of the fluid passages and fins can be optimally designed (i.e., in a diamond-shape, airfoil-shape, etc.) to achieve more optimal airflow between the fan blades.

It is also noteworthy that in a standard passenger vehicle, the speed of the vehicle is often significant enough that air can flow in a substantially linear direction through the conventional radiator (i.e., natural translation of the radiator). In essence, the vehicle provides the necessary airflow due to its speed. With a construction work machine like a motor grader, a crawler, a loader, etc., however, the machine does not travel fast enough to generate enough air flow. Thus, an advantage of the present disclosure is that the rotary heat exchanger (RHE) replaces the conventional radiator or cooling system and transforms something that is used to receiving only translational air into a device that now rotates to generate the necessary airflow.

Figure 3:
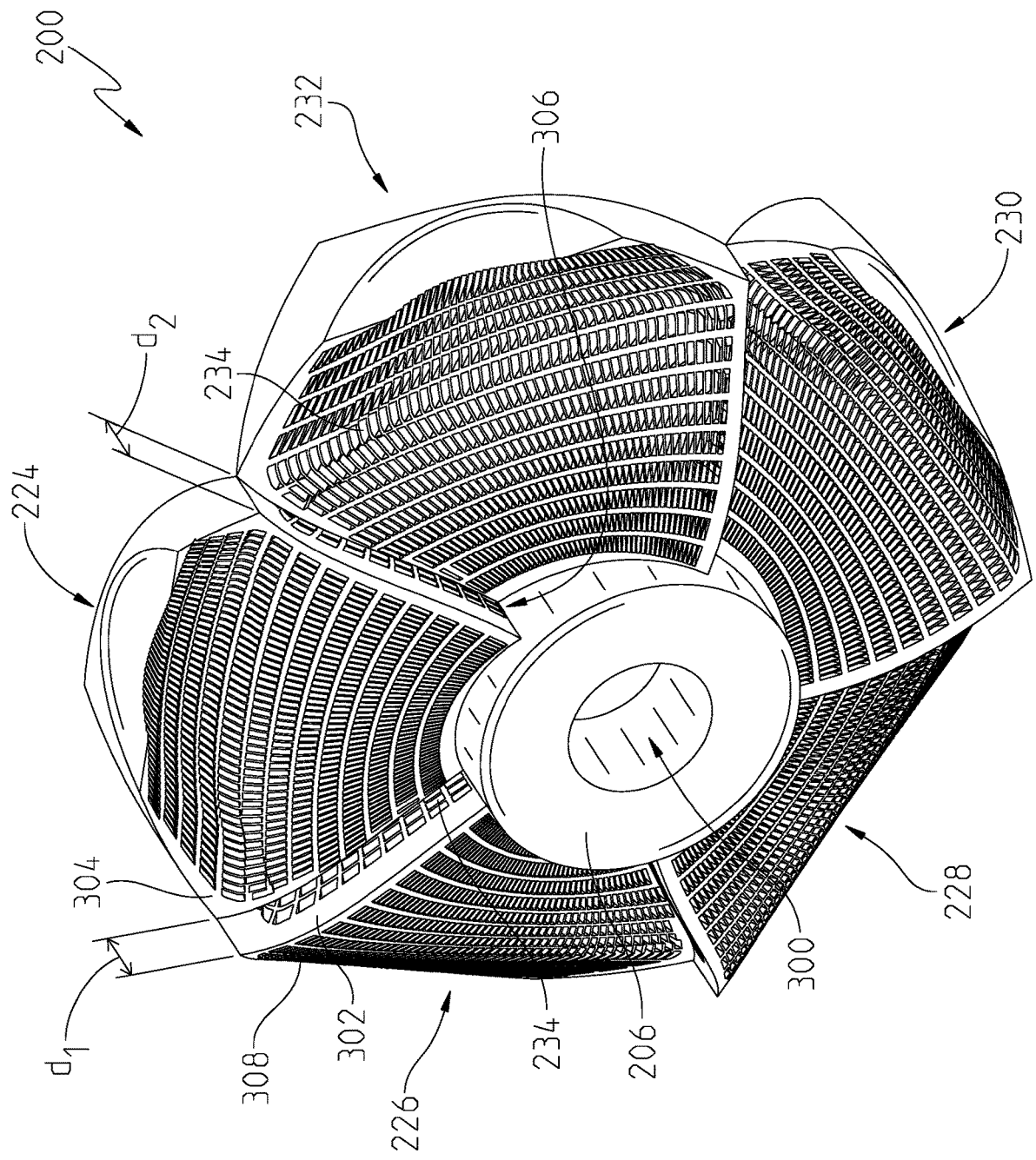
FIG. 3 is a rear perspective view of the rotary heat exchanger of FIG. 2.

Referring to FIG. 3 of the present disclosure, the rear of the RHE 200 is illustrated. The hub 206 is shown with the drive shaft 202 being removed. As shown, the hub 206 defines a bore 300 through which the shaft 202 is disposed. During operation, the hub 206 and rotary manifold 204 may be rotataby driven via the drive shaft 202 about a rotation axis that passes through the center of the shaft 202 and bore. In one embodiment, the fluid lines and connectors do not rotate.

Figure 4:
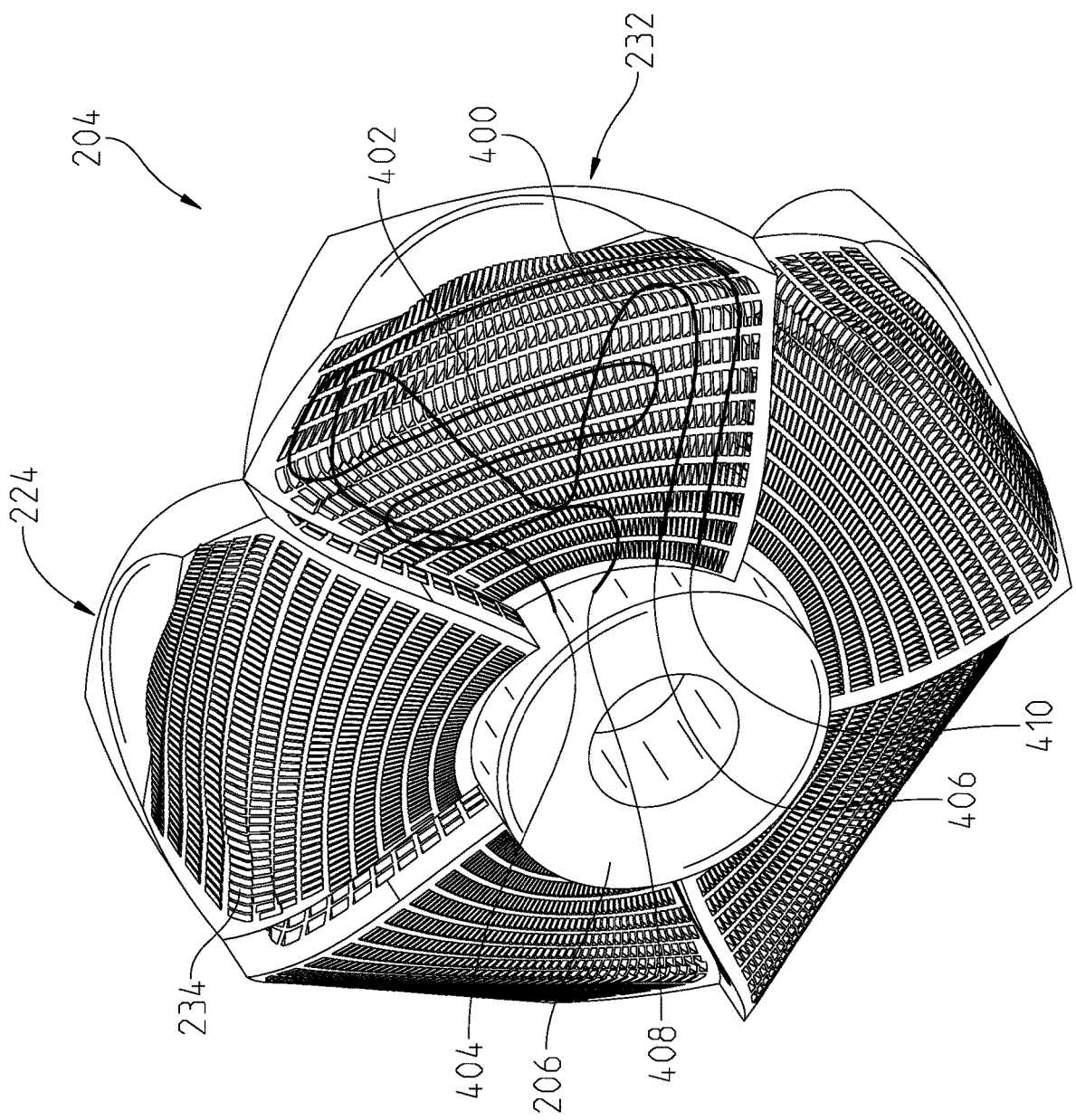
FIG. 4 is a perspective view of the rotary heat exchanger of FIG. 2 with fluid channels.

As described above, the RHE 200 is configured as a combined rotary fan or airfoil and a heat exchanger that takes the place of a conventional cooling system. In the present disclosure, any type of fan or airfoil may be manufactured via 3-D printing as part of the RHE. For instance, the fan or airfoil may be centrifugal, axial, propeller, tube-axial, vane-axial, squirrel-cage, or any other known type of fan. In FIGS. 2-4, an axial fan is shown as part of the RHE 200, but it is understood that any of the aforementioned fans may be used.

The heat exchangers or heat exchanger portions (sections) may be disposed or positioned between the fan blades. This is clearly shown in FIGS. 2-4. As also noted above, the cooling fin profiles may be oriented to match the computational fluid dynamics (i.e., CFD) predicted flow path. In other words, there may be a passage defined in at least one heat exchanger portion or section through which a fluid flows within the cooling fins grids following the CFD, or otherwise provided, path of optimal flow for heat transfer or efficiency. To get optimal efficiency with driving the fan or airfoil, it is necessary to move the air through the heat exchanger as efficiently as possible.

The heat exchanger may also include curvilinear fins rather than fins designed solely based on CFD analysis. In addition, the hub 206 may be designed to include fins or fluid passages as well to assist with cooling the hub. For example, the hub design may have similar cooling fins as the heat exchanger portions or sections.

The rotary heat exchanger (RHE 200) of FIGS. 2-4 may be designed to allow one or more fluids to be directed into each heat exchanger portion or section. For example, different fluid systems can be directed to and cooled by the same heat exchanger portion or different heat exchanger portions in the same RHE 200. In FIG. 4, for example, there may be two fluid passages provided for one or more of the heat exchanger portions or sections. In the second heat exchanger portion 226 of the RHE 200, a first fluid path 400 and a second fluid path 402 are formed therein. Each of the fluid paths may carry the same type of fluid. Alternatively, each of the fluid paths may carry a different type of fluid. Each fluid path may have its own inlet and outlet. The first fluid path 400, for example, may include a first inlet 404 and a first outlet 406. The second fluid path 402 may include a second inlet 408 and a second outlet 410. Each of the first and second inlets and outlets may be fluidly coupled to the hub 206 and/or rotary manifold 204. With the inlet fluid line 218 supplying fluid to the hub 206 or rotary manifold 204, the fluid may be directed to either the first inlet 404 or the second inlet 406. As the fluid flows through the first or second fluid path, it exits the heat exchanger portion 226 or section via the first outlet 408 or second outlet 410 and enters the return line 220.

In one embodiment, it is possible for the fluid path in the second heat exchanger portion 226 to be fluidly coupled in series with a fluid path in another heat exchanger portion or section of the RHE. For example, one fluid path in the first heat exchanger portion 224 may be fluidly coupled with the first or second fluid path in the second heat exchanger portion 226. The two fluid paths may be fluidly coupled to one another via the rotary manifold in one example. In another example, it may be possible that a single fluid line is formed in the RHE 200 but it is formed in two or more of the heat exchanger portions or sections.

Alternatively, each heat exchanger portion or section may have its own inlet and outlet separate from the other heat exchanger portions or sections in the RHE. Thus, the RHE may include multiple fluid inlets 218 and fluid outlets 220 in this instance. This may particularly be the case if one type of fluid (e.g., water) is flowing through one heat exchanger portion (e.g., the first heat exchanger portion 224) and a second type of fluid (e.g., oil) is flowing through another heat exchanger portion (e.g., the second heat exchanger portion 226). Thus, the two types of fluids will travel through different fluid paths and heat exchanger fins.

In the RHE of FIGS. 2-4, the rotary manifold 204 may comprise an inner portion (not shown) and an outer portion. The inner portion may be integrally manufactured with the rest of the RHE via 3-D printing, whereas the outer portion is connected to the inlet fluid line 218 and outlet fluid line 216. In this manner, the inner portion (not shown) may rotate with the fan blades and heat exchangers, while the outer portion and fluid lines remain stationary.

In a conventional rotary manifold, cross-drilled holes are normally formed perpendicularly to one another. In other words, a conventional rotary manifold may include cross-drilled holes that form right angles and fluid flows through the cross-drilled holes due to being pressurized. With additive manufacturing and 3-D printing, the rotary manifold 204 of the RHE 200 may include fluid holes and passages integrally formed at any desirable angle. As such, the holes and passages may not be perpendicular to one another, and as a result, fluid flow is improved as there is less resistance to flow therethrough. In one example, the fluid paths may be curved rather than configured at right angles to one another. Thus, another benefit of manufacturing the rotary heat exchanger via 3-D printing is improving fluid flow by integrally forming the various flow paths and openings in the rotary manifold (particularly the inner portion) without cross-drilling.

Referring to the RHE 200 of FIGS. 2-4, each heat exchanger portion or section may be substantially pie-shaped or wedge-shaped. The fan blades may also have a similar shape as the heat exchanger portions. In addition, the fan blades may have a curvature design to promote optimal airflow through the heat exchanger portions. In other words, the fan blades are not oriented perpendicular to a direction of air flow indicated by arrow 240 in FIG. 2. Instead, the blades may be at least partially angled relative to the direction of flow 240.

Moreover, each fan blade may include a first edge 236 and a second edge 238. As shown in FIG. 2, the first edge 236 and second edge 238 may not be disposed within the same plane as the first blade 208. The first blade 208 may be partially concave defined between the first edge 236 and the second edge 238. Further, the first edge 236 may be forward of the second edge 238 along the majority of their lengths.

As a result of the shapes of each fan blade, the heat exchanger portions or sections may be circumferentially offset from one another. For example, in FIG. 3, the first exchanger portion 224 includes a first rear surface 304 that is offset by a distance $d_1$ from a second rear surface 308 of the second heat exchanger portion 226. A third surface 302 is shown including a plurality of cooling fins 234 located between the first rear surface 304 of the first heat exchanger portion 224 and the second rear surface 308 of the second heat exchanger portion 226. Similarly, a fourth rear surface 306 is shown located between the first rear surface 304 of the first heat exchanger portion 224 and a corresponding rear surface of the fifth heat exchanger portion 232. As shown, the first heat exchanger portion 224 may be offset from the fifth heat exchanger portion 232 by distance $d_2$. Each of the heat exchanger portions may be offset from one another as shown in FIG. 3. The offset distance may be approximately the same (i.e., $d_1=d_2$) or different. In any event, the offset distance and positioning of each heat exchanger portion may be formed by 3-D printing.

Another feature of the offset edges of the heat exchanger is the ability to digest debris and allow for improved air flow through the heat exchanger. At times, debris can get carried in the air flow and possibly clog one or more cooling fins. This can obstruct air flow through the heat exchanger and impact the cooling efficiency of the entire rotary heat exchanger. With the different edges being offset from another, debris may contact these edges and break apart such that they can pass through the heat exchanger more easily.

Returning to FIG. 4, the fluid passages 400, 402 formed in each heat exchanger portion and which convey fluid flow may be designed to optimize heat transfer to the cooling fins. The path which the fluid takes through the one or more passages in the heat exchanger may be related to the areas of the heat exchanger subject to the best air velocity and cooling fin surface area. The cooling efficiency of the heat exchanger may vary locally depending upon the radial distance and angular position in a given heat exchanger portion or section. For example, fluid passage sizes and geometries may vary and include branch-like channels or passages in a particular section to optimize fluid flow, energy usage and heat transfer. The same is also true as it relates to fin spacing and geometry for achieving optimal airflow and heat transfer.

The fluid passages or flow through the different heat exchanger portions may vary. For instance, some passages may zig-zag horizontally, zig-zag vertically, spiral, etc. Examples of how the passages may be formed via 3-D printing in the second heat exchanger portion 226 are shown in FIG. 4. With 3-D printing, the passages may vary in size and geometry to promote optimal flow.

With the 3-D printing process of the rotary heat exchanger, it is desirable to manufacture the fan or airfoil to achieve balance across its diameter or width. Due to the rotational velocity of the fan blades, it is possible (if not likely) that vibration, noise, and other effects may occur in the machine or vehicle during operation. Another consideration during the manufacturing process of the fan or airfoil is to match or closely match the air flow over the fan blades during operation. If there is a difference in air flow over the blades, it may be possible to bend or deform the blades during operation. In the event of bending, there may be higher tip velocity compared to hub velocity. Thus, to achieve proper balance and air flow across the blades, it may be necessary to form larger passages near the hub and smaller passages radially outward toward the tips of the blades.

With rotational motion, another design consideration is centrifugal forces that may force fluid radially outward during operation. In some cases, the centrifugal forces may help move the fluid from the hub or core of the radial heat exchanger and through the cooling passages defined in the plurality of heat exchanger portions. In other cases, the shape of the fluid passages through the cooling fins can be designed to be highly efficient for air flow by tapering leading and trailing edges. These tapered edges can also better leverage centrifugal forces to facilitate improved fluid flow.

In the rotary heat exchanger, there may be a pressure differential across the core generated by the rotational motion. Due to this differential, many rotary heat exchangers will include a relatively straight fluid passage leading from the core (or hub) radially outward before it begins zig-zagging, spiralling or otherwise. It is desirable to pressure the fluid flow radially outward toward the outer radial edge of the heat exchanger portion where the fluid can be cooled more quickly. In other words, during operation a hot fluid may be injected into the hub 206 or core of the rotary heat exchanger 200 via the inlet line 218. The fluid will be pressurized such that it flows through the one or more fluid paths in the heat exchanger portion(s) before it exits via the hub 206. In this manner, the rotary heat exchanger hub or core functions as a centrifugal pump being driven by a motor or other rotary drive mechanism. Thus, the rotary heat exchanger functions as a combination of a centrifugal pump and heat exchanger as there are two competing fluids acting on the system, i.e., the air acting on the outside of the rotary heat exchanger and a fluid being pressurized or pumped through the heat exchanger passages via the hub.

Figure 6:
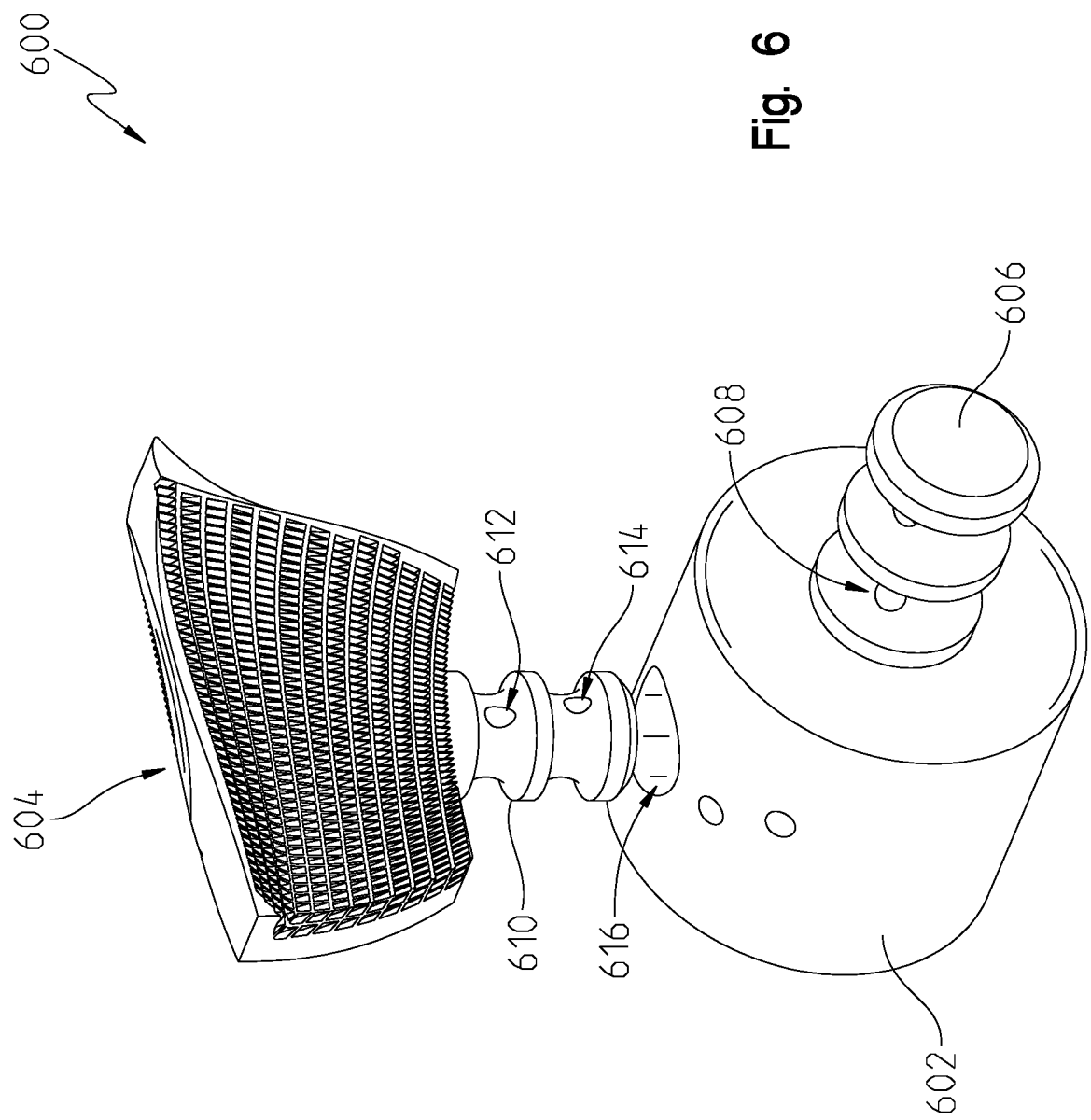
FIG. 6 is a perspective view of a variable vane rotary heat exchanger.

In FIG. 6, another embodiment of a rotary heat exchanger 600 is illustrated. The rotary heat exchanger 600 is shown including a hub or core 602, a variable vane heat exchanger 604, and a rotary manifold 606. In this embodiment, the rotary heat exchanger 600 may be formed by a plurality of variable vane heat exchangers 604 which may be removably coupled to the hub or core 602. Here, the hub or core 602 may include a plurality of bores or openings 616 through which each variable vane heat exchanger 604 may be positioned. Each variable vane heat exchanger 604 may include its own rotary manifold 610 for coupling to the hub or core 602. As shown, the main rotary manifold 606 may include an inlet 608 through which a hot fluid enters the rotary heat exchanger 600. The fluid may enter the variable vane heat exchanger 604 via a first inlet 612 and pass through one or more fluid passages (not shown) therein. Once the fluid flows through the variable vane heat exchanger 604, it may exit through an outlet 614.

With the rotary heat exchanger 600 of FIG. 6, each variable vane heat exchanger 604 may be adjustably oriented at different angles or pitches relative to the other variable vane heat exchangers in order to achieve different characteristics. Each variable vane heat exchanger 604 includes its own fan blade and may be manufactured by a 3-D printing process. The respective heat exchanger 604 includes its own secondary rotary manifold 610 for conveying one or fluids through its respective fluid passages. The heat exchanger 604 also includes its own cooling fins which may be manufactured to promote optimal flow and cooling.

In at least one aspect of the present embodiment, a solenoid may be energized or de-energized to control rotational movement of one or more variable vane heat exchangers 604. A controller may communicate a signal to the solenoid to rotationally adjust the heat exchanger 604 to alter air flow therethrough. To minimize losses and reduce inefficiency, a single solenoid may be used to control each of the plurality of variable vane heat exchangers 604 in unison to alter airflow.

Figure 7:
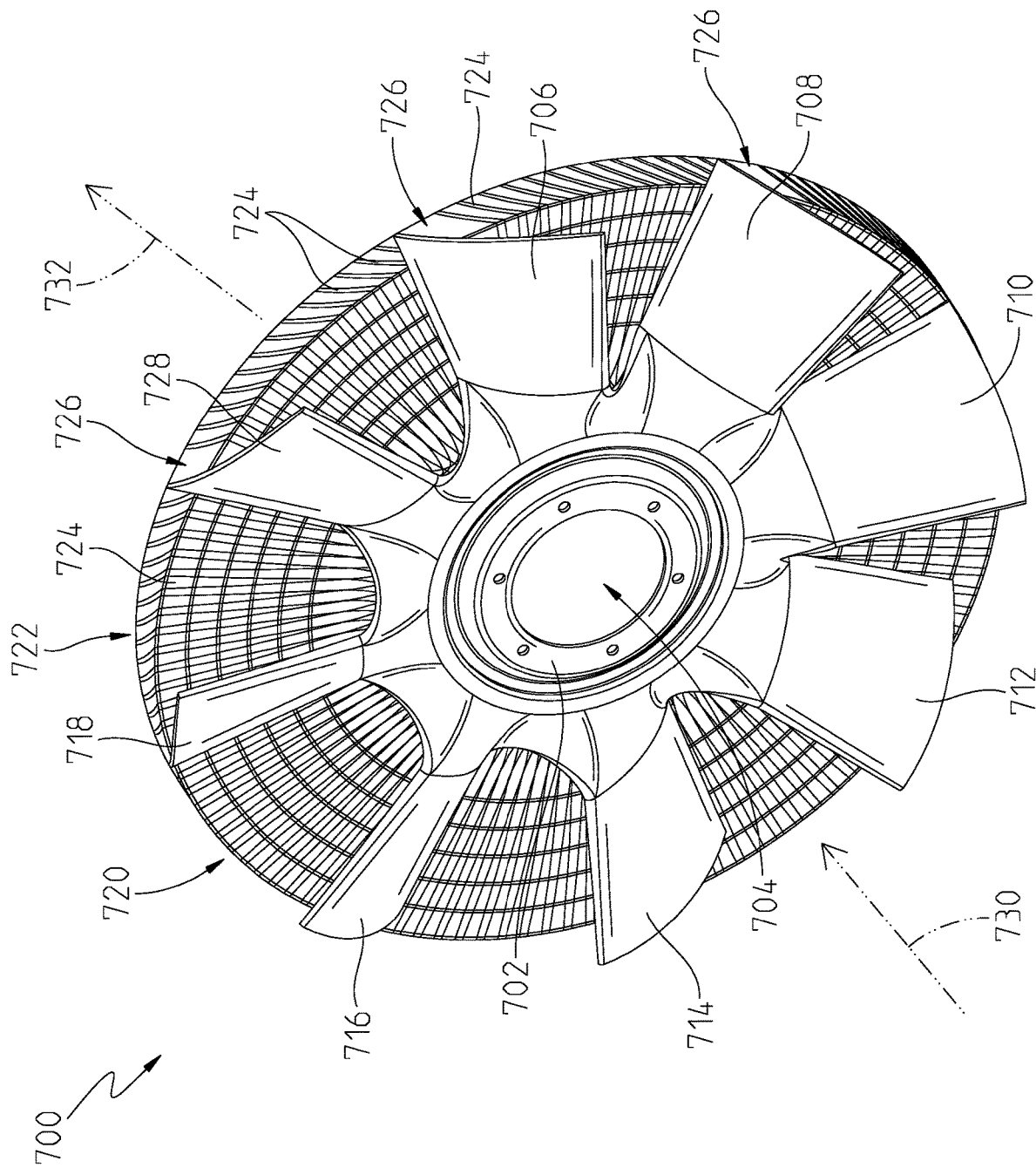
FIG. 7 is a side perspective view of a second embodiment of a rotary heat exchanger.

Turning to FIG. 7, a further embodiment of a rotary heat exchanger 700 is shown. In this rotary heat exchanger 700, a hub or core 702 is integrally formed via 3-D printing with a plurality of fan or airfoil blades. The hub or core 702 defines a central bore 704 through which a shaft (not shown) may operably rotate the rotary heat exchanger 700. The rotary heat exchanger 700 may be rotatably driven about a rotation axis (not shown) that passes through the center of the central bore 704. The plurality of fans or airfoil blades may include a first blade 706, a second blade 708, a third blade 710, a fourth blade 712, a fifth blade 714, a sixth blade 716, a seventh blade 718 and an eighth blade 728.

A heat exchanger is also integrally formed with the hub 702 and plurality of blades via the 3-D printing process. The heat exchanger may include a plurality of heat exchanger portions or sections located between a pair of the plurality of fan blades. For instance, a first heat exchanger portion 720 is shown being formed between the sixth fan blade 716 and the seventh fan blade 718. Moreover, a second heat exchanger portion 722 is shown formed between the seventh heat exchanger portion 722 and the eighth heat exchanger portion 728.

The heat exchanger may be manufactured with a plurality of cooling fins 724 as shown. The plurality of cooling fins 724 may form fluid passages for conveying fluid through the different heat exchanger portions. During operation, air may be generated and flow into the rotary heat exchanger via arrow 730. As the air exits from the rear of the rotary heat exchanger 700, it does so along a direction indicated by arrow 732. In this embodiment, the air flow is shown as being substantially perpendicular to a plane in which the heat exchanger is defined.

In many applications and industries, there are stringent requirements regarding the velocity at which air can flow into and through a conventional heat exchanger. The reason for these stringent requirements is due to the possibility of debris becoming embedded between cooling fins of the heat exchanger and not coming loose when or if the fan blades are rotated in a reverse direction. Thus, there is a need to avoid debris becoming embedded or stuck in the heat exchanger during operation.

With the rotary heat exchanger 700 of FIG. 7, for example, there may be high tangential air speeds which can make it difficult for any debris or other material to be embedded or stuck between cooling fins. In many instances, debris or other material may break apart upon contact with a leading edge of a fan blade of the rotary heat exchanger and therefore still flow between the fan blades and cooling fins due to these additional forces.

Nevertheless, the rotary heat exchanger 700 may be designed to be robust against any size of debris being carried in the air flow and, in many instances, macerate the debris. In other instances, the rotary heat exchanger 700 may be designed to include one or more gaps or large openings 726 located adjacent each fan blade so that as the rotary heat exchanger rotates, larger particles or debris may collect and pass through the gap or larger opening 726 in the heat exchanger. In other words, debris that is forced into the center of the heat exchanger may be sucked in towards the surface of a fan blade and discharged through the gap or larger opening 726. In effect, these gaps or large openings further reduce the chance of debris or larger particles from becoming embedded in the heat exchanger. Moreover, the design of this particular rotary heat exchanger 700 is such that variable spacing between the cooling fins is possible with 3-D printing and additive manufacturing, whereas conventional heat exchangers are unable to achieve this variable spacing with more conventional stamping processes. Further, the 3-D printing process can achieve the variable spacing without any extra cost and less scrap than conventional stamping processes.

In the rotary heat exchanger 700 of FIG. 7, there are eight different fan blades shown. In other embodiments, the rotary heat exchanger may include additional or fewer fan blades. For every fan blade, there is a corresponding heat exchanger portion.

The heat exchanger of the unitary rotary heat exchanger 700 of FIG. 7 may be disposed within a plane. Thus, the heat exchanger may be manufactured as a planar body having a plurality of cooling fins and fluid passages formed therein. It is noteworthy that the planar structure of the heat exchanger is different from the wedge-shaped heat exchanger of the rotary heat exchanger 200 in FIGS. 2-4.

The fan blades are designed to direct the air flow into the heat exchanger, similar to that described for the RHE 200 above. Each fan blade may include a front side, a rear side, a leading edge, and a trailing edge. In FIGS. 2-4, each heat exchanger portion began at the trailing edge of a fan blade and extended laterally to the leading edge of an adjacent fan blade. In FIG. 7, however, each heat exchanger portion extends laterally from the trailing edge of one blade to the trailing edge of an adjacent blade.

Figure 8:
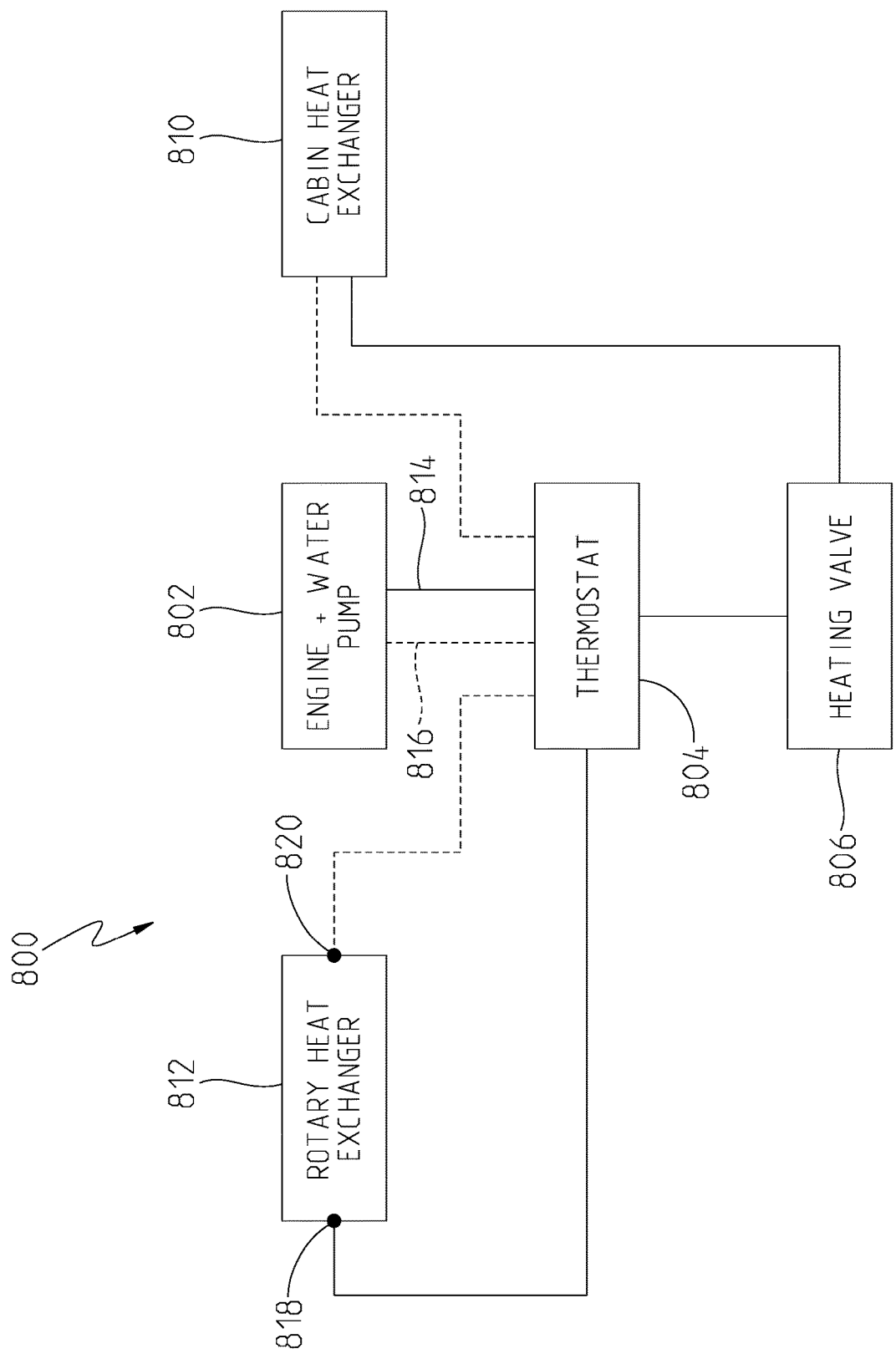
FIG. 8 is a schematic of a cooling system including a rotary heat exchanger in combination with an engine.

Referring now to FIG. 8, a vehicular system 800 is shown including an engine and water pump assembly 802, a thermostat 804, a heating valve 806 (which may be optional), and a cabin heat exchanger 810. These features may be conventional to the system 800. There may be other components or assemblies part of the system 800 as well, including a cooling system. In FIG. 8, the cooling system of the vehicular system 800 is in the form of a rotary heat exchanger 812. The rotary heat exchanger 812 may be similar to the ones described above and shown in FIGS. 2-7.

In FIG. 8, the engine 802 functions as a means for generating power and the water pump functions to pump water or other fluid through the system 800. A first fluid line 814 is provided between the engine and water pump assembly 802 and the thermostat 804. The first fluid line 814, shown as a solid line in FIG. 8, also is between the thermostat 804 and heating valve 806, and between the heating valve 806 and the cabin heat exchanger 810. The first fluid line 814 also is between the thermostat 804 and an inlet 818 of the rotary heat exchanger 812.

The system 800 may also include a second fluid line 816, which is shown in broken lines. The second fluid line 816 may be between an outlet 820 of the rotary heat exchanger 812 and the thermostat 804. The same fluid line 816 may be between the cabin heat exchanger 810 and the thermostat 804. Likewise, the second fluid line 816 may run between the thermostat 804 and the engine and water pump assembly 802.

In the embodiment of FIG. 8, the first fluid line 814 may be a pressurized or supply line and the second fluid line 816 may be a return line. A fluid flowing from the first fluid line 814 to the rotary heat exchanger 812 may be at an elevated temperature, where it is cooled by air flow moved by the fan blades and passing through the cooling fins of the rotary heat exchanger 812. The fluid exiting the rotary heat exchanger 812 may be at a cooler temperature at the outlet 820 than when it arrived at the inlet 818. Thus, the cooler fluid returns to the engine and water pump assembly 802 after passing through the rotary heat exchanger 812.

The rotary heat exchanger 812 may be driven by a motor (not shown). A separate controller (not shown) may operably control the rotational speed of the fan blades. In this manner, the rate at which air is directed by the fan into the heat exchanger of the rotary heat exchanger may be operably controlled by adjusting fan speed. Both fan speed and pump flow may be simultaneously controlled and dynamically varied to optimize the cooling performance and energy efficiency of the cooling system.

In this system, the flow of fluid to the rotary heat exchanger may be operably controlled by engine speed. The water pump may be operably controlled by the engine or an electric motor (not shown). In one example, an electric drive may operably control pump flow.

In FIG. 8, the rotary heat exchanger is part of the overall system which includes a means for pumping fluid through the system, and the rate of fluid flow and fan speed may be operably controlled. More particularly, the rotary heat exchanger comprises a single device functioning as a variable speed pump and fan where the fan is an integral part of the heat exchanger.

Although a cabin heat exchanger is shown in FIG. 8, it is also possible that a second rotary heat exchanger may replace part or all of the cabin heat exchanger. As such, a rotary heat exchanger may be used and take the form of any fan type including a squirrel cage.

In another example of the present disclosure, a rotary heat exchanger may be used to replace part of or all of a cooling system of a vehicle. The rotary heat exchanger may also include one or more sections of the heat exchanger which is empty and does not include cooling fins and fluid passages. For instance, in a conventional vehicle cooling system, several components form the system to allow for the expansion of fluid therein. In one example of the present embodiment, an integral expansion tank or overflow reservoir such as found on an automotive radiator or other cooling system may be incorporated into the rotary heat exchanger. In this case, a heat exchanger portion may be designed as a hollow cavity without cooling fins, where a fill cap and integral thermostat may be incorporated with the cavity.

It may also be possible to provide integral valves to divert fluid to additional cooling sections (i.e., heat exchanger portions or sections) of the rotary heat exchanger. The same integral valves may also divert fluid to limit fluid flow to one or more cooling sections. Other features may be designed into the rotary heat exchanger to allow fluid flow between two or more portions or sections of the heat exchanger, and these are only a few examples contemplated to fall within the scope of this disclosure. Moreover, other embodiments in which two or more rotary heat exchangers are stacked or combined axially is also possible.

Figure 9:
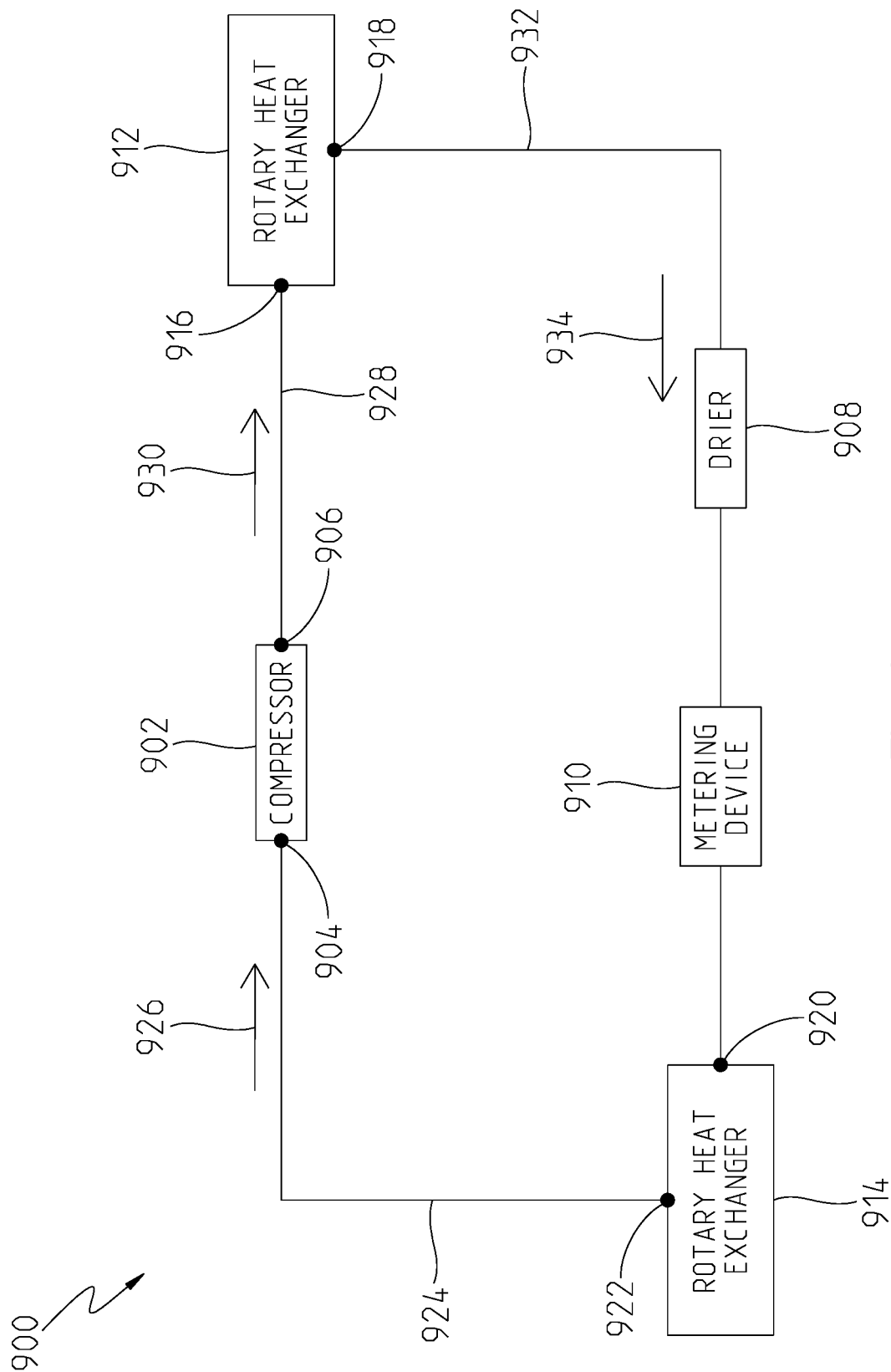
FIG. 9 is a schematic of an air conditioning system with a rotary heat exchanger.

Referring to FIG. 9, an air conditioning multi-phase system 900 is illustrated. The system 900 is shown including a compressor 902 having an inlet 904 and an outlet 906, a drier 908, a meter device 910, a first rotary heat exchanger 912 and a second rotary heat exchanger 914. In this embodiment, the first rotary heat exchanger 912 effectively replaces a condenser in a conventional air conditioning system, and the second rotary heat exchanger 914 replaces the evaporator. In other words, the system 900 in FIG. 9 is such that the evaporator and condenser heat exchangers and blower fans are replaced by a pair of rotary heat exchangers in order to reduce the space claim of the overall system.

The first rotary heat exchanger (RHE) 912 may include an inlet 916 and an outlet 918. Likewise, the second RHE 914 may include an inlet 920 and an outlet 922. A suction line 924 may be provided between the outlet 922 of the second RHE 914 and the inlet 904 of the compressor 902 such that fluid flows through the system 900 in a direction indicated by arrow 926. A discharge line 928 may also be provided between the outlet 906 of the compressor 902 and the inlet 916 of the first RHE 912. Again, fluid flows through the discharge line 928 in a direction indicated by arrow 930.

A liquid line 932 is defined between the outlet 918 of the first RHE 912 and the drier 908. Fluid continues to flow through the liquid line 932 in a direction indicated by arrow 934. This fluid may be referred to as the refrigerant flow.

In one instance, it may be possible to flow gases through the rotary heat exchangers in FIG. 9 rather than liquids to cool the air for air conditioning applications. In the present system, the expansion of compressed Freon, for example, may become a gas and then is compressed and becomes a liquid. Thus, the fluid is a liquid in part of the system 900 and a gas in the evaporation portion thereof.

The evaporator, or second RHE 914, can absorb heat from the air flow and deliver it to the refrigerant to achieve desirable climate control. Thus, the RHE is able to absorb heat from the air flow while also circulating the fluid to function as an integrated fan air conditioner with cooling blades. In this system, one advantageous aspect is that due to the rotary motion of the RHE, any moisture is unable to solidify and "ice up" the blades.

With the system 900 of FIG. 9, the rotary heat exchangers are capable of providing means to exchange heat through fluids and gases, where heat may be rejected to the air or absorbed from the air. Other advantages associated with this system will be apparent to one skilled in the art.

In a further application of the present disclosure, a waste heat recovery system 1000 may be provided. Here, the system 1000 may include a pump 1002, a turbine 1004, a generator 1006, a first rotary heat exchanger 1008 and a second rotary heat exchanger 1010. The first RHE 1008 may include an inlet 1028 for receiving fluid and an outlet 1030 for discharging fluid. Likewise, the second RHE 1010 may include an inlet 1012 for receiving fluid and an outlet 1014 for discharging fluid.

In this system, the first RHE 1008 may replace a conventional condenser and the second RHE 1010 may replace a conventional evaporator. A conventional Rankine cycle for recovering waste exhaust heat and energy may be applied to this system 900 in order to improve the thermodynamic efficiency of an engine or other power-generating device.

As shown in FIG. 9, the pump 1002 may supply pressurized fluid to a first fluid line 1016. Here, the fluid may flow in the first fluid line 1016 in a direction indicated by arrow 1018. The fluid may pass through the inlet 1012 of the second RHE 1010. As the fluid exits the outlet 1014 of the second RHE 1010, it may pass through a second fluid line 1020 in a direction indicated by arrow 1022. Here, the exhaust pressure may be used to rotatably drive the turbine 1004 from its intake side and boost air pressure. As noted above, in other modes, an organic Rankine cycle may be used to create a phase change due to the exhaust. In any event, the exhaust pressure may be used to rotate the turbine 1010.

The turbine 1004 can be coupled to the generator for generating power. In this system 1000, rather than using a cooling jacket in which organic fluid receives heat, the hot side of the turbine 1004 may be used to create a phase change, i.e., the hot exhaust gases may be used to recover power via the generator 1006.

Figure 10:
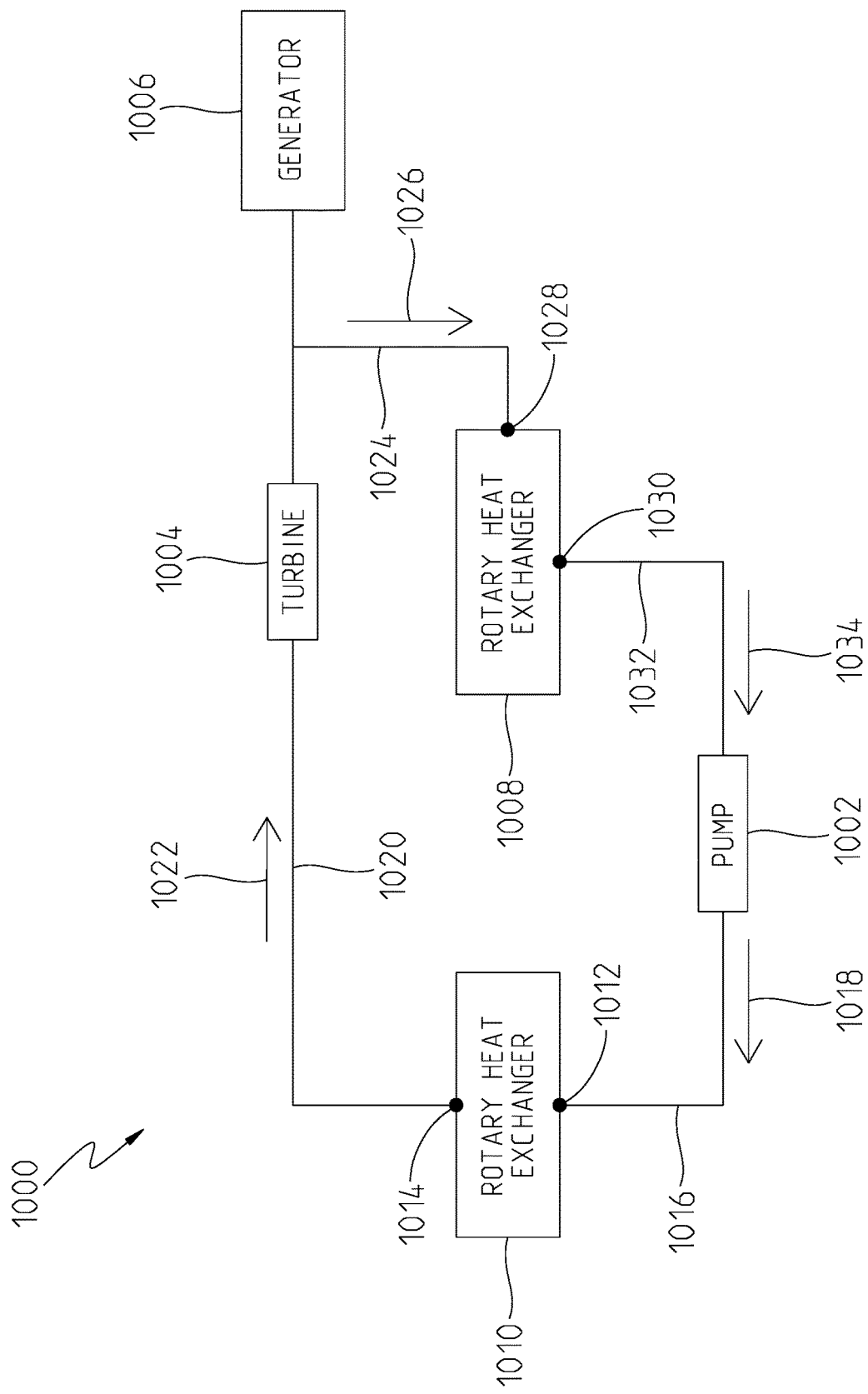
FIG. 10 is a schematic of a waste heat recovery system with a rotary heat exchanger.

Fluid may flow through a third fluid path 1024 in a direction indicated by arrow 1026 as shown in FIG. 10 where it is received at the inlet 1028 of the first RHE 1008. After passing through the first RHE, the fluid may exit via the outlet 1030 and pass through a suction line 1032 along direction 1034 back to the suction side of the pump 1002.

In today's world of phase change materials, R134A is a known material. But although it is a known material, more exotic materials are being pushed and tried where carbon dioxide is the refrigerant. Here, instead of making liquid carbon dioxide in the condenser, the fluid is being cooled. Thus, heat transfer is occurring with a gas that won't damage pipes and has a thermal capacity associated with it. A pressure drop or difference of the turbine 1004 may drive the fan or airfoil of the rotary heat exchanger as well as providing direct access to the heat.

It is to be understood that in the present disclosure, any refrigerant may be used and in some cases multiple types of refrigerants. Moreover, one or more phase change materials are also contemplated.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A rotary heat exchanger, comprising:
a hub configured to be rotatably driven by a shaft about a rotational axis defining an axial direction;
a fan comprising a plurality of fan blades integrally coupled to the hub and extending radially outwardly therefrom, wherein each of the plurality of fan blades comprises a leading edge and a trailing edge; and
a heat exchanger comprising a plurality of heat exchanger sections, the heat exchanger including a plurality of cooling fins for receiving a flow of air from the fan;
wherein each heat exchanger section comprises a corresponding front surface;
wherein the front surface of each of the plurality of heat exchanger sections extends between a corresponding two fan blades of the plurality of fan blades from a location adjacent the leading edge of one fan blade of the corresponding two fan blades to a location adjacent the trailing edge of the other fan blade of the corresponding two fan blades; and
wherein the location adjacent the leading edge of one fan blade and the location adjacent the trailing edge of the other fan blade are offset from one another in the axial direction.

2. The rotary heat exchanger of claim 1, further comprising:
a first fluid passage defined in a first heat exchanger section of the plurality of heat exchanger sections; and
a second fluid passage defined in a second heat exchanger section of the plurality of heat exchanger sections;
wherein, the first fluid passage is fluidly coupled to the second fluid passage such that a fluid flowing through the heat exchanger flows through the first and second fluid passages.

3. The rotary heat exchanger of claim 1, further comprising:
a first fluid passage defined in a first heat exchanger section of the plurality of heat exchanger sections; and
a second fluid passage defined in the first heat exchanger section;
wherein, the first fluid passage is fluidly isolated from the second fluid passage such that a first fluid flows through the first fluid passage and a second fluid flows through the second fluid passage.

4. The rotary heat exchanger of claim 1, further comprising a fluid passage defined in at least one heat exchanger section, the fluid passage comprising a diameter which is larger at a radial location near the hub and smaller at a radial location away from the hub.

5. The rotary heat exchanger of claim 1, wherein the rotary heat exchanger comprises a circular profile.

6. The rotary heat exchanger of claim 1, wherein the plurality of cooling fins are curvilinearly shaped.

7. The rotary heat exchanger of claim 6, wherein the plurality of cooling fins comprise a shape and orientation corresponding to a direction of air flow received from the fan.

8. The rotary heat exchanger of claim 1, wherein:
each fan blade of the plurality of fan blades further comprises a front side and a rear side; and
each of the plurality of heat exchanger sections comprises a wedge-shape and is integrally formed with the rear side of one fan blade of the plurality of fan blades and the trailing edge of a laterally adjacent fan blade of the plurality of fan blades.

9. The rotary heat exchanger of claim 1, wherein each heat exchanger section comprises a corresponding and respective fluid path;
wherein each fluid path comprises an inlet extending out of the hub and an outlet extending into the hub.

10. The rotary heat exchanger of claim 9, wherein each fluid path is contained within the corresponding and respective heat exchanger section.

11. The rotary heat exchanger of claim 1, wherein the hub comprises a plurality of fluid inlets and a plurality of fluid outlets;
wherein each heat exchanger section comprises a corresponding and respective fluid path; and
wherein each fluid path fluidly connects a corresponding fluid inlet of the plurality of fluid inlets and a corresponding fluid outlet of the plurality of fluid outlets.

12. The rotary heat exchanger of claim 11, wherein the fluid path of each heat exchanger section is fluidly isolated from the fluid path of another heat exchanger section.

13. The rotary heat exchanger of claim 1, wherein the front surface of each heat exchanger section curves in the axial direction between the location adjacent the leading edge of one fan blade and the location adjacent the trailing edge of the other fan blade.

14. The rotary heat exchanger of claim 1, wherein, the hub, the fan, and the heat exchanger are integrally formed as a single body.

15. A cooling system of a vehicle, comprising:
an engine for generating power;
a pump for pumping a fluid; and a first rotary heat exchanger for cooling the fluid, the first rotary heat exchanger manufactured by a three-dimensional printing process and comprising:
- a hub configured to be rotated about a rotational axis defining an axial direction;
- a fan comprising a plurality of fan blades integrally coupled to the hub and extending radially outwardly therefrom, wherein each fan blade comprises a leading edge and a trailing edge;
- a heat exchanger comprising a plurality of heat exchanger sections, the heat exchanger including a plurality of cooling fins for receiving a flow of air from the fan; and
- a rotary manifold coupled to the hub, the rotary manifold comprising a fluid passage defined therein for conveying the fluid from the pump to the heat exchanger;
- wherein each of the plurality of heat exchanger sections comprises a corresponding front surface that extends from a location adjacent the trailing edge of one corresponding fan blade and the leading edge of another corresponding fan blade; and
- wherein the location adjacent the trailing edge of one corresponding fan blade and the location adjacent the leading edge of the other corresponding fan blade are offset from one another in the axial direction; and
- wherein, the first rotary heat exchanger is rotatably driven to direct the air through the plurality of cooling fins to reduce a temperature of the fluid passing through the heat exchanger.

16. The system of claim 15, further comprising one or more additional rotary heat exchangers axially aligned with the first rotary heat exchanger, the one or more additional rotary heat exchangers positioned to receive at least a portion of the flow of air exiting the first rotary heat exchanger.

17. A rotary heat exchanger, comprising:
- a hub configured to be rotatably driven by a shaft about a rotational axis defining an axial direction;
- a fan comprising a plurality of fan blades integrally coupled to the hub and extending radially outwardly therefrom, wherein each fan blade comprises a first edge and a second edge, wherein one of the first edge or the second edge is a leading edge of the fan blade, and wherein the other of the first edge or the second edge is a trailing edge of the fan blade; and
- a heat exchanger comprising a plurality of heat exchanger sections, the heat exchanger including a plurality of cooling fins for receiving a flow of air from the fan;
- wherein each heat exchanger section of the plurality of heat exchanger sections is integrally formed with a corresponding first fan blade of the plurality of fan blades and extends from a location adjacent the first edge of the corresponding first fan blade to the second edge of a corresponding second fan blade of the plurality of fan blades, and wherein the first edge of the corresponding first fan blade is offset from the second edge of the corresponding second fan blade in the axial direction;
- wherein each heat exchanger section comprises a front surface defined by the plurality of cooling fins, and wherein the front surface of each heat exchanger section extends in the axial direction.

18. The rotary heat exchanger of claim 17, further comprising a rotary manifold coupled to the hub, the rotary manifold comprising a fluid passage defined therein for conveying a fluid or gas to the heat exchanger.

19. The rotary heat exchanger of claim 18, wherein each heat exchanger section comprises a corresponding and respective passage; and
- wherein each passage is connected with the fluid passage of the rotary manifold.

20. The rotary heat exchanger of claim 17, wherein each heat exchanger section of the plurality of heat exchanger sections extends between and connects a rear side of the corresponding first fan blade and the trailing edge of the corresponding second fan blade.

* * * * *